US012621905B2

(12) United States Patent
Deshmukh et al.

(10) Patent No.: US 12,621,905 B2
(45) Date of Patent: May 5, 2026

(54) METHOD AND RLC ENTITY FOR TIMER MANAGEMENT IN WIRELESS COMMUNICATION SYSTEM

(71) Applicant: Samsung Electronics Co., Ltd., Suwon-si (KR)

(72) Inventors: Aneesh Deshmukh, Bangalore (IN); Gopinatha Reddy Sadhu, Bangalore (IN); Nayan Ostwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 18/167,302

(22) Filed: Feb. 10, 2023

(65) Prior Publication Data

US 2023/0189394 A1 Jun. 15, 2023

Related U.S. Application Data

(63) Continuation of application No. PCT/KR2021/014494, filed on Oct. 18, 2021.

(30) Foreign Application Priority Data

Oct. 20, 2020 (IN) ............................. 202041045706
Oct. 4, 2021 (IN) ........................... 2020 41045706

(51) Int. Cl.
    *H04W 76/38* (2018.01)
    *H04L 5/00* (2006.01)
(52) U.S. Cl.
    CPC ........... *H04W 76/38* (2018.02); *H04L 5/0055* (2013.01)
(58) Field of Classification Search
    CPC ..... H04W 76/38; H04W 28/02; H04W 80/02; H04L 1/1851; H04L 1/1642; H04L 5/0055; H04L 47/28; H04L 47/34
    See application file for complete search history.

(56) References Cited

U.S. PATENT DOCUMENTS 11,228,399 B2 * 1/2022 Zhou ...................... H04L 1/1893
2012/0047407 A1 * 2/2012 Tilwani ................. H04L 1/1841
                                                              714/E11.067

(Continued)

FOREIGN PATENT DOCUMENTS

KR 10-2018-0131411 A 12/2018
KR 10-2020-0009096 A 1/2020
WO 2019/030726 A1 2/2019

OTHER PUBLICATIONS

Indian Office Action dated May 12, 2022, issued in Indian Application No. 202041045706.

*Primary Examiner* — Ayman A Abaza
*Assistant Examiner* — Van Ta Nguyen
(74) *Attorney, Agent, or Firm* — Jefferson IP Law, LLP

(57) ABSTRACT

A method for timer management in a radio link control (RLC) layer in a wireless communication system is provided. The method includes activating, by an RLC entity, a timer at first time, in response to receiving a first set of data packets from at least one user equipment (UE) in an RLC receiving window and deactivating, by the RLC entity, the timer at second time, in response to receiving a second set of data packets from the at least one UE in the RLC receiving window. Further, the method includes determining, by the RLC entity, whether there is at least one missing data packet in the RLC receiving window, and reactivating the timer and prohibiting generation of a status report, in response to determining that there is the at least one missing data packet, or generating the status report, if there is no the at least one missing data packet.

10 Claims, 12 Drawing Sheets

(56) References Cited

U.S. PATENT DOCUMENTS

| 2015/0163741 | A1 | 6/2015 | Sheth et al. | |
|---|---|---|---|---|
| 2015/0237621 | A1 | 8/2015 | Zhu | |
| 2016/0127939 | A1* | 5/2016 | Bathwal | H04W 24/10 |
| | | | | 370/252 |
| 2020/0022212 | A1 | 1/2020 | Eda et al. | |
| 2020/0120750 | A1 | 4/2020 | Liu et al. | |
| 2020/0205224 | A1 | 6/2020 | Lee et al. | |
| 2020/0245400 | A1 | 7/2020 | Zheng et al. | |
| 2021/0075547 | A1* | 3/2021 | Tao | H04W 28/10 |
| 2021/0105787 | A1* | 4/2021 | Park | H04W 72/542 |

* cited by examiner t1 | 0 | 1 | 2 |   | 4 |    t2 | 5 | 6 with poll |    t3 | 9 with poll

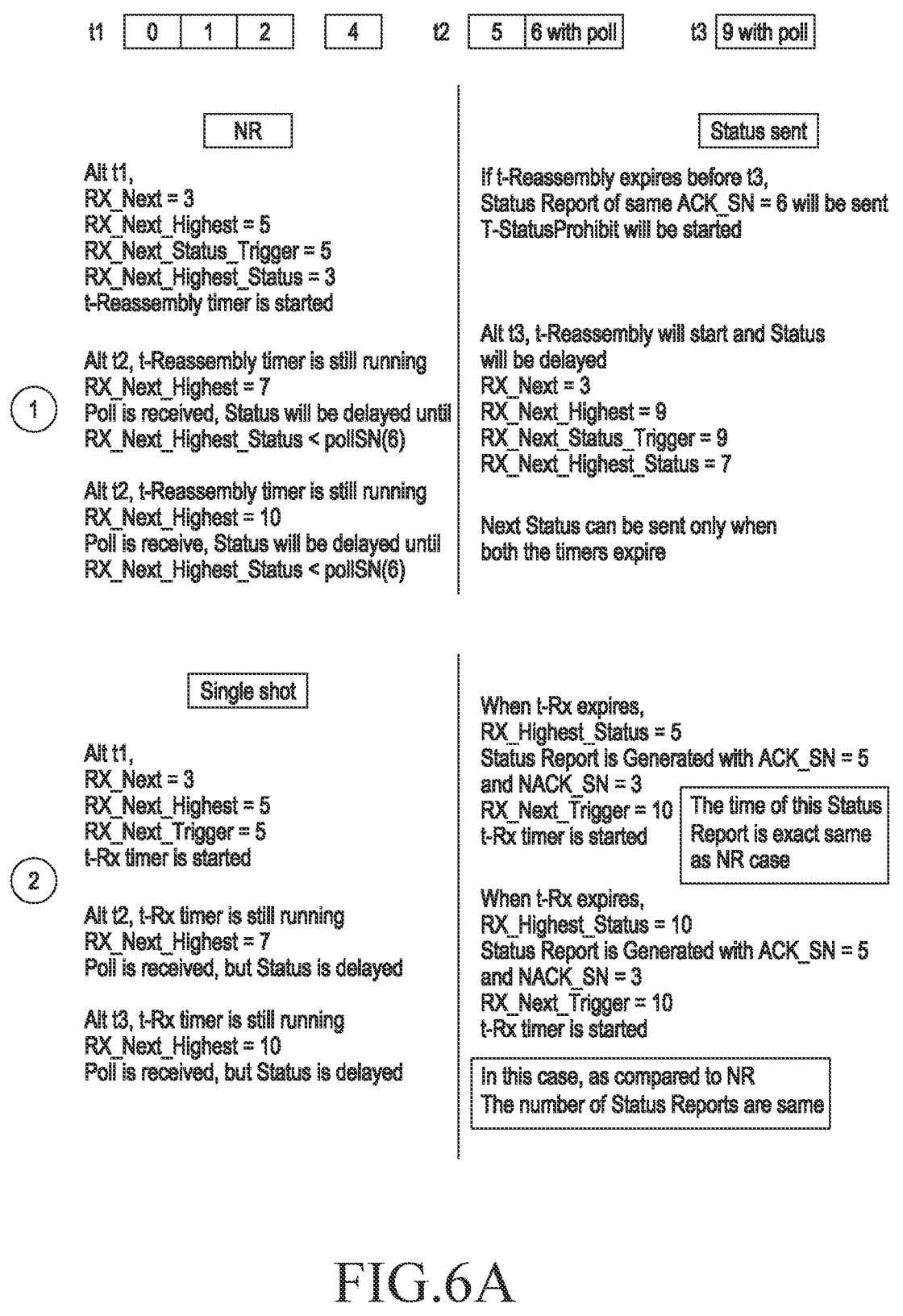

NR

Alt t1,
RX_Next = 3
RX_Next_Highest = 5
RX_Next_Status_Trigger = 5
RX_Next_Highest_Status = 3
t-Reassembly timer is started (1)

Alt t2, t-Reassembly timer is still running
RX_Next_Highest = 7
Poll is received, Status will be delayed until
RX_Next_Highest_Status < pollSN(6)

Alt t2, t-Reassembly timer is still running
RX_Next_Highest = 10
Poll is receive, Status will be delayed until
RX_Next_Highest_Status < pollSN(6)

Status sent

If t-Reassembly expires before t3,
Status Report of same ACK_SN = 6 will be sent
T-StatusProhibit will be started Alt t3, t-Reassembly will start and Status
will be delayed
RX_Next = 3
RX_Next_Highest = 9
RX_Next_Status_Trigger = 9
RX_Next_Highest_Status = 7

Next Status can be sent only when
both the timers expire

Single shot

Alt t1,
RX_Next = 3
RX_Next_Highest = 5
RX_Next_Trigger = 5
t-Rx timer is started (2)

Alt t2, t-Rx timer is still running
RX_Next_Highest = 7
Poll is received, but Status is delayed Alt t3, t-Rx timer is still running
RX_Next_Highest = 10
Poll is received, but Status is delayed When t-Rx expires,
RX_Highest_Status = 5
Status Report is Generated with ACK_SN = 5
and NACK_SN = 3
RX_Next_Trigger = 10
t-Rx timer is started The time of this Status
Report is exact same
as NR case When t-Rx expires,
RX_Highest_Status = 10
Status Report is Generated with ACK_SN = 5
and NACK_SN = 3
RX_Next_Trigger = 10
t-Rx timer is started In this case, as compared to NR
The number of Status Reports are same

FIG.6A

Figure 6B:
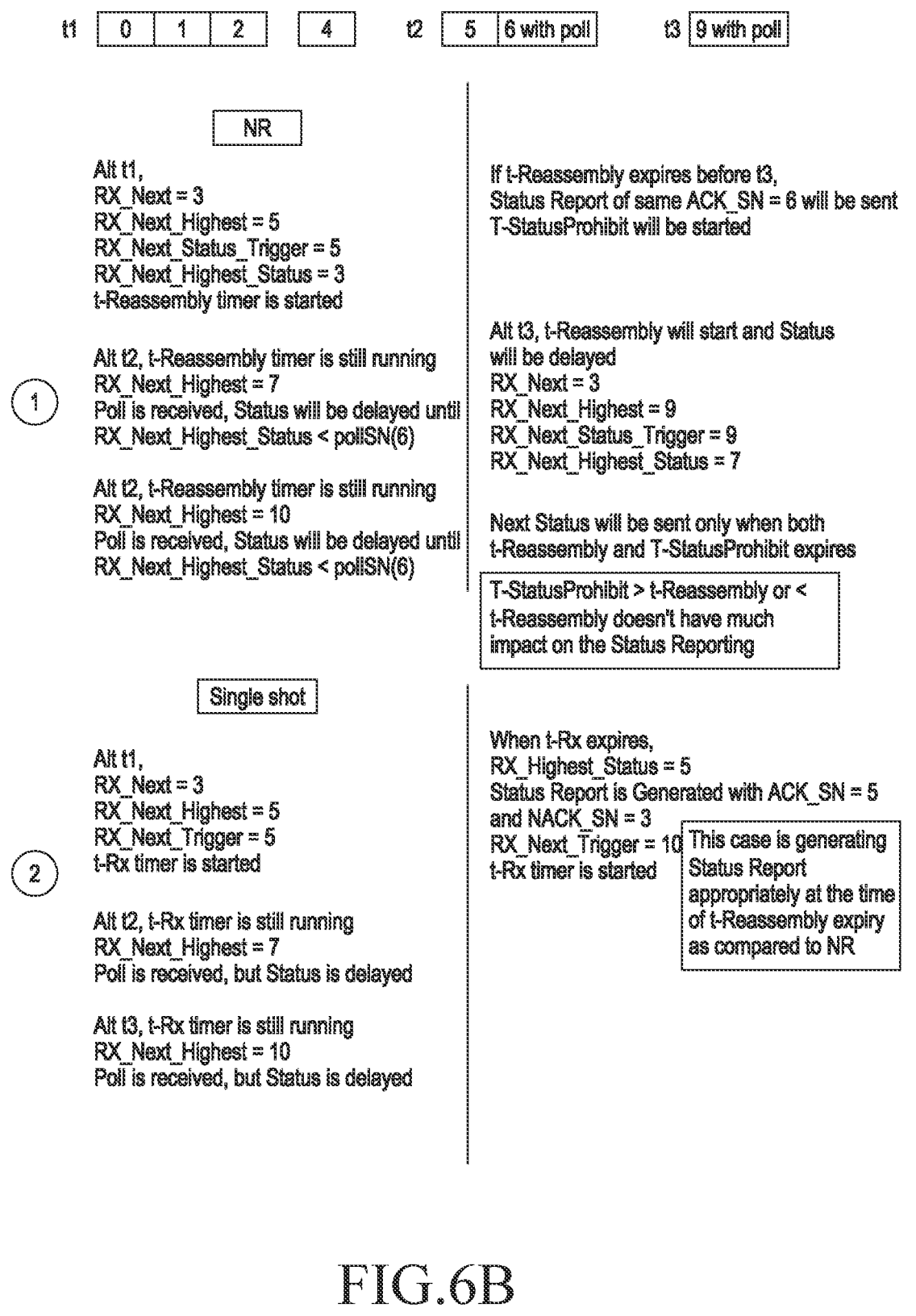

| t1 | 0 | 1 | 2 | | 4 | t2 | 5 | 6 with poll | | t3 | 9 with poll |

NR

Alt t1,
RX_Next = 3
RX_Next_Highest = 5
RX_Next_Status_Trigger = 5
RX_Next_Highest_Status = 3
t-Reassembly timer is started If t-Reassembly expires before t3,
Status Report of same ACK_SN = 6 will be sent
T-StatusProhibit will be started Alt t2, t-Reassembly timer is still running
RX_Next_Highest = 7
Poll is received, Status will be delayed until
RX_Next_Highest_Status < pollSN(6)

Alt t3, t-Reassembly will start and Status
will be delayed
RX_Next = 3
RX_Next_Highest = 9
RX_Next_Status_Trigger = 9
RX_Next_Highest_Status = 7

Alt t2, t-Reassembly timer is still running
RX_Next_Highest = 10
Poll is received, Status will be delayed until
RX_Next_Highest_Status < pollSN(6)

Next Status will be sent only when both
t-Reassembly and T-StatusProhibit expires T-StatusProhibit > t-Reassembly or <
t-Reassembly doesn't have much
impact on the Status Reporting

①

Single shot

Alt t1,
RX_Next = 3
RX_Next_Highest = 5
RX_Next_Trigger = 5
t-Rx timer is started When t-Rx expires,
RX_Highest_Status = 5
Status Report is Generated with ACK_SN = 5
and NACK_SN = 3
RX_Next_Trigger = 10
t-Rx timer is started This case is generating
Status Report
appropriately at the time
of t-Reassembly expiry
as compared to NR Alt t2, t-Rx timer is still running
RX_Next_Highest = 7
Poll is received, but Status is delayed Alt t3, t-Rx timer is still running
RX_Next_Highest = 10
Poll is received, but Status is delayed

METHOD AND RLC ENTITY FOR TIMER MANAGEMENT IN WIRELESS COMMUNICATION SYSTEM

CROSS-REFERENCE TO RELATED APPLICATION(S)

This application is a continuation application, claiming priority under § 365(c), of an International application No. PCT/KR2021/014494, filed on Oct. 18, 2021, which is based on and claims the benefit of an Indian patent application number 202041045706, filed on Oct. 20, 2020, in the Indian Patent Office, and of an Indian patent application number 202041045706, filed on Oct. 4, 2021, in the Indian Patent Office, the disclosure of each of which is incorporated by reference herein in its entirety.

BACKGROUND

1. Field

The disclosure relates to wireless communication. More particularly, the disclosure relates to a method and a radio link control (RLC) entity for timer management in a wireless communication system.

2. Description of Related Art

In general, operation of each RLC acknowledgement mode (AM) entity in systems of $5^{th}$ generation (5G), Beyond 5G, $6^{th}$ generation (6G) wireless network requires two timers at receiver side and one timer at transmitter side. Timers are generally implemented as large lines of codes which require significant memory and processing to be supported for timer events such as for example start, restart, stop and expiry. In some systems, the timers are implemented using hardware timers and are limited in number. In other systems, there are other timers as well in the system apart from RLC timers.

The above information is presented as background information only to assist with an understanding of the disclosure. No determination has been made, and no assertion is made, as to whether any of the above might be applicable as prior art with regard to the disclosure.

SUMMARY

Network equipment supports thousands of user equipments (UEs) simultaneously and therefore multiple RLC entities for each of the UEs. Each RLC entity requires at least three timers. This poses a huge requirement on memory and processing to support timer framework. Additionally, there are multiple other timers required for other NW functionality apart from the RLC. In low cost or low end devices, there is a possibility to reduce processing requirement for the timer by optimizing or reducing the number of timers which needs to be supported. With increasing number of required RLC entities to be supported in future or parallel sub-flows implementation for single dedicated radio bearer (DRB) flow, the overhead on the need of timers to be supported will rise exponentially and hence the same needs to be addressed.

Actual timers can be reduced by using time stamps to take decisions based on time expired since an event for timer start. However, such implementations are not possible for the RLC timer as they may cause functional errors. An event of timer expiry is necessary and hence, some timers have to execute.

Aspects of the disclosure are to address at least the above-mentioned problems and/or disadvantages and to provide at least the advantages described below. Accordingly, an aspect of the disclosure is to provide a method and an RLC entity for timer management in an RLC layer in a wireless communication system using a new timer generated by combining functionalities of existing t-Reassembly Timer and t-Status prohibit timer of the RLC layer. The use of new timer instead of multiple timers significantly reduces memory requirements as well as processing requirements at the RLC entity, thereby optimizing available resources.

Additional aspects will be set forth in part in the description which follows and, in part, will be apparent from the description, or may be learned by practice of the presented embodiments.

In accordance with an aspect of the disclosure, a method for timer management in a radio link control (RLC) layer in a wireless communication system is provided. The method includes activating, by an RLC entity, a timer at first time, in response to receiving a first set of data packets from at least one UE in an RLC receiving window and deactivating, by the RLC entity, the timer at second time, in response to receiving a second set of data packets from the least one UE in the RLC receiving window. The method also includes determining, by the RLC entity, whether there is at least one missing data packet in the RLC receiving window. Further, the method includes reactivating the timer and prohibiting generation of a status report, in response to determining that there is the at least one missing data packet, and generating the status report, in response to determining that there is no the at least one missing data packet.

In an embodiment, the timer is generated by combining of a first timer and a second timer of the RLC layer, and the first timer is used to detect that there is the at least one missing data packet in the RLC receiving window and the second timer is used to prohibit a transmission of the status report associated with the at least one missing data packet.

In another embodiment, the timer is implemented as a single timer for the RLC layer of the at least one UE and the RLC entity if a value of the timer and a value of a poll timer are same.

In yet another embodiment, the single timer is implemented as one of a single shot timer specific to the RLC entity and a periodic timer for multiple RLC entities associated with the RLC layer.

In still another embodiment, the timer is implemented as the periodic timer if timer values configured for each of the multiple RLC entities are same.

In accordance with another aspect of the disclosure, a Radio Link Control (RLC) entity node for timer management in an RLC layer in a wireless communication system is provided. The RLC entity node includes a transceiver, a memory, and at least one processor. The at least one processor is configured to activate a timer at first time, in response to receiving a first set of data packets from at least one UE in an RLC receiving window and deactivate the timer at second time, in response to receiving a second set of data packets from the at least one UE in the RLC receiving window. Further, the at least one processor is also configured to determine whether there is the at least one missing data packet in the RLC receiving window, and reactivate the timer and prohibiting generation of a status report, in response to determining that there is the at least one missing data packet, and generate the status report, in response to determining that there is no the at least one missing data packet.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A is an example illustrating a comparison between t-Rx=t-Reassembly>t-StatusProhibit timer, according to an embodiment of the disclosure;

FIG. 6B is an example illustrating a comparison between t-Rx=t-Reassemblytimer<t-StatusProhibit timer, according to an embodiment of the disclosure.

Throughout the drawings, it should be noted that like reference numbers are used to depict the same or similar elements, features, and structures.

DETAILED DESCRIPTION

Figure 1:
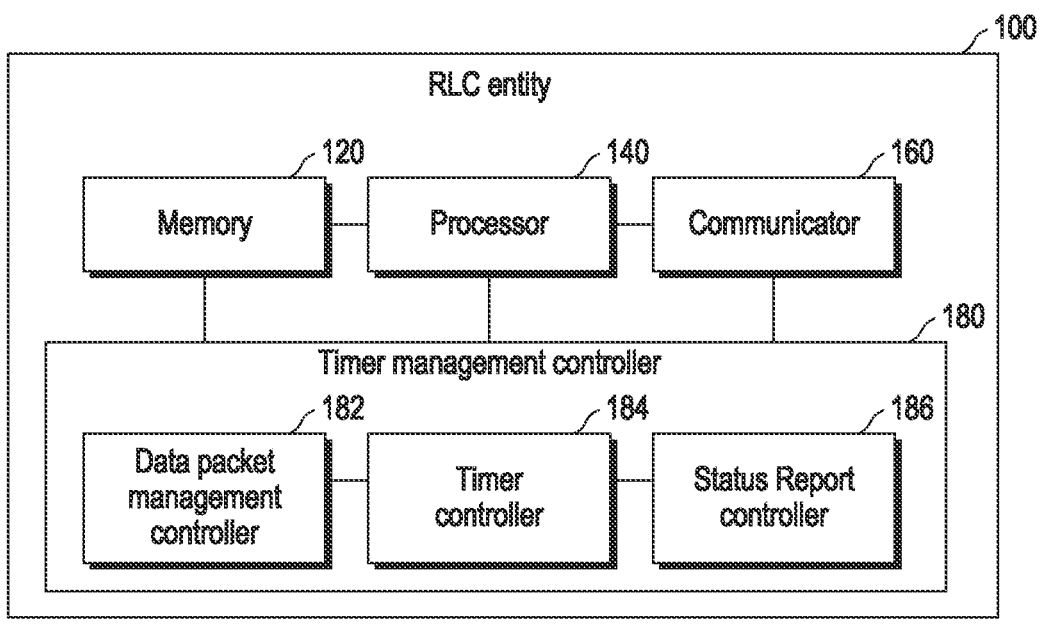
FIG. 1 is a block diagram of an RLC entity for timer management in an RLC layer in a wireless communication system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. Additionally, the circuits constituting a block may be implemented by dedicated hardware, or by a processor (e.g., one or more programmed microprocessors and associated circuitry), or by a combination of dedicated hardware to perform some functions of the block and a processor to perform other functions of the block. Further, each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

5G NR Procedure as defined in Spec 38.322: At radio link control (RLC) RX, t-Reassembly timer is started for any missing hole in an RLC window and the t-Reassembly timer continues to run until a particular hole for which the t-Reassembly timer was started is filled. In an embodiment, the purpose of the t-Reassembly timer is to account for two aspects, one is related to reordering as well as to accommodate for a time in case if non-contiguous segments of the same packet are received and it is necessary to wait for a given time based on how long it takes for lower layers to try recovering the missing packets or segments. Moreover, in wireless communication, the packet arrival over different paths may lead to out of order reception of the packets and the t-Reassembly timer helps in overcoming the variable nature of the wireless channel So any timer, which is accounting for the time which may be assumed to be safe enough to wait before triggering recovery may be considered as t-Reassembly or t-Reordering timer as well. In case, the current hole is filled, i.e., the previously missing SNs are filled, there is a check to start the t-Reassembly timer again based on new holes present in the RLC window. In another embodiment, the restart of the t-Reassembly timer is done to account for the new holes, which are likely to be generated later than the previous hole, and there is a need to account for the lower layer recoveries for the same. On expiry of the t-Reassembly timer, a status report is triggered up to RX_Highest_Status and a new hole if present is triggered until RX_Next_Highest.

In an embodiment, on transmission of the status report to a lower layer, a t-StatusProhibit timer is started, until the expiry of which even if the t-Reassembly timer would have expired, a new Status Report would not be sent. The reason for providing the t-StatusProhibit timer is to ensure that the transmitter acts upon the receiver's status received and performs retransmissions in order to perform any recovery if applicable. Further, due to the nature of the t-Reassembly timer, it is less likely that any new information will be transmitted as there will not be a change in the receiving window after the t-Reassembly for the portion of the window under consideration. Also, there can be multiple triggers for the Status Report to be generated, for example, polling from the transmitter. In case if a recent Status Report was already generated, it is better to delay the transmission of the next Status Report for the time configured as per the t-StatusProhibit. It also helps to effectively communicate between the transmitter and the receiver and using the optimal wireless resources.

In most of the deployments, the t-StatusProhibit and the t-Reassembly have same timer values. Moreover, none of the timer expiry operations are extremely time critical and some delay in execution of operations performed after timer expiry is acceptable. In an embodiment, the t-StatusProhibit always follow a t-Reassembly timer expiry eventually as generating the Status Report is a must. In another embodiment, the t-StatusProhibit may also be started because of poll received from a transmission (TX) entity.

Accordingly, the embodiments herein disclose a method for timer management in an RLC layer in a wireless communication system. The method includes activating, by an RLC entity, a timer at first time, in response to receiving a first set of data packets from at least one UE in an RLC receiving window and deactivating, by the RLC entity, the timer at second time, in response to receiving a second set of data packets from the at least one UE in the RLC receiving window. The method also includes determining, by the RLC entity, whether there is at least one missing data packet in the RLC receiving window. Further, the method includes reactivating the timer and prohibiting generation of a status report, in response to determining that there is the at least one missing data packet, and generating the status report, in response to determining that there is no the at least one missing data packet.

Accordingly, the embodiments herein disclose an RLC entity node for timer management in an RLC layer in a wireless communication system. In an embodiment, the RLC entity node includes a memory, a transceiver and at least one processor. The at least one processor is configured to activate a timer at first time, in response to receiving a first set of data packets from at least one UE in an RLC receiving window and deactivate the timer at second time, in response to receiving a second set of data packets from the at least one UE in the RLC receiving window. Further, the at least one processor is also configured to determine whether there is at least one missing data packet in the RLC receiving window, and reactivate the timer and prohibiting generation of a status report, in response to determining that there is the at least one missing data packet, and generate the status report, in response to determining that there is no the at least one missing data packet.

In conventional methods and systems, a status packet prohibition timer is forbidden from starting when the status report reflects a part of the reception conditions of RLC protocol data units (PDUs) being transmitted by the RLC entity. Further, only after being polled by the RLC entity or a reordering timer expires, the status report is transmitted by the RLC entity for remaining part of the reception conditions of the RLC PDUs. However, the memory requirement and processing power requirement may be reduced but still persists.

Unlike to the conventional methods and systems, in the proposed method, a new timer is generated with combined functionalities of existing timers. Therefore, the proposed method does not seem to have any significant impact on the procedural aspect because of soft real-time nature of an RLC layer. However, the memory requirement and the processing power requirement drastically reduce thereby saving system resources.

In the proposed method, the new timer may be implemented as a single shot timer as well as a periodic timer for the RLC entity based on configuration.

In an embodiment, the proposed method also allows multiple timers to be grouped and run as a single global timer for multiple RLC entities saving on memory, processing and requirement of timers for RLC.

Referring now to the drawings and more particularly to FIGS. 1 to 4, 5A to 5E, 6A, 6B, and 7, where similar reference characters denote corresponding features consistently throughout the figure, these are shown preferred embodiments.

FIG. 1 is a block diagram of an RLC entity (100) for timer management in an RLC layer in a wireless communication system, according to an embodiment of the disclosure.

Referring to FIG. 1, an RLC entity (100) is a logical module handling RLC functionality related to transmission and reception of any data being communicated over a modem processor. The RLC entity (100) includes a memory (120), a processor (140), a communicator (160), and a timer management controller (180).

In an embodiment, the memory (120) comprises instructions to be executed on the processor (140). The memory (120) may include non-volatile storage elements. Examples of such non-volatile storage elements may include magnetic hard discs, optical discs, floppy discs, flash memories, or forms of electrically programmable read only memories (EPROM) or electrically erasable and programmable ROM (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) is configured to store larger amounts of information than the memory. In other examples, a non-transitory storage medium may store data that can, over time, change (e.g., in random access memory (RAM) or cache).

In an embodiment, the processor (140) is coupled to the memory (120), the communicator (160) and the timer management controller (180). In another embodiment, the processor (140) may include one or more processors. The one or more processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (140) may include multiple cores and is configured to execute the instructions stored in the memory (120).

In an embodiment, the communicator (160) is configured to facilitate communication between the various hardware components of the RLC entity (100) and between the RLC entity (100) and at least one UE. In another embodiment, the communicator (160) may be referred to as a transceiver.

In another embodiment, the time management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. In an embodiment, the time management controller (180) includes a data packet management controller (182), a timer controller (184) and a status report controller (186).

In yet another embodiment, the data packet management controller (182) is configured to receive a first set of data and a second set of data in an RLC receiving window. The first set of data and the second set of data are protocol data units (PDUs) from at least one UE. The data packet management controller (182) is configured to determine whether there are missing data packets in the RLC receiving window after receiving the first set of data and the second set of data.

In still another embodiment, the timer controller (184) is configured to activate a timer at first time (e.g. time $t_1$), in response to receiving the first set of data packets from the at least one UE in the RLC receiving window. The timer controller (184) is configured to deactivate the timer at second time (e.g. time $t_2$), in response to receiving the second set of data packets from the at least one UE in the RLC receiving window. The timer is generated by combining existing functionalities of a t-Reassembly Timer and a t-Statusprohibit timer of the RLC layer, and the t-Reassembly timer detects that there are missing data packets in the RLC receiving window and is configured by upper layers to wait to receive the missing data packets. The t-Reassembly timer allows lower layers to try various possible recovery techniques to recover the missing data packets and expires on determining that the recovery may not be possible or when the missing data packets is received. The t-status prohibit timer prohibits a transmission of the status report associated with the missing data packets accounted for by the t-Reassembly timer. The timer is implemented as a single timer for the RLC layer of the at least one UE and the RLC entity (100) when a value of the timer and a poll timer are same. The single timer is implemented as one of a single shot timer specific to the RLC entity (100) and a periodic timer for all entities associated with the RLC layer within one of the RLC entity (100) and multiple RLC entities. The timer implemented as the periodic timer for multiple RLC entities associated with the RLC layer when timer values configured for each of the multiple RLC entities associated with the RLC layer is same.

In an embodiment, the timer controller (184) is configured to receive an input from the data packet management controller (182) indicating that there are missing data packets and in response to the received indication the timer controller (184) reactivates the timer and prohibits the generation of the status report. Further, a single timer value may be used for both TX and reception (RX) entity in RLC if the t-Rx and t-Poll timer values are similar In another embodiment, the status report controller (186) is configured to receive an input from the data packet management controller (182) indicating that there are missing data packets and in response to the received indication prohibit status report generation. The status report controller (186) is configured to receive an input from the data packet management controller (182) indicating that there are no missing data packets and in response to the received indication generate the status report.

Although FIG. 1 shows the hardware elements of the RLC entity (100) but it is to be understood that other embodiments are not limited thereon. In other embodiments, the RLC entity (100) may include less or more number of elements. Further, the labels or names of the elements are used only for illustrative purpose and does not limit the scope of the disclosure. One or more components may be combined together to perform same or substantially similar function.

Figure 2:
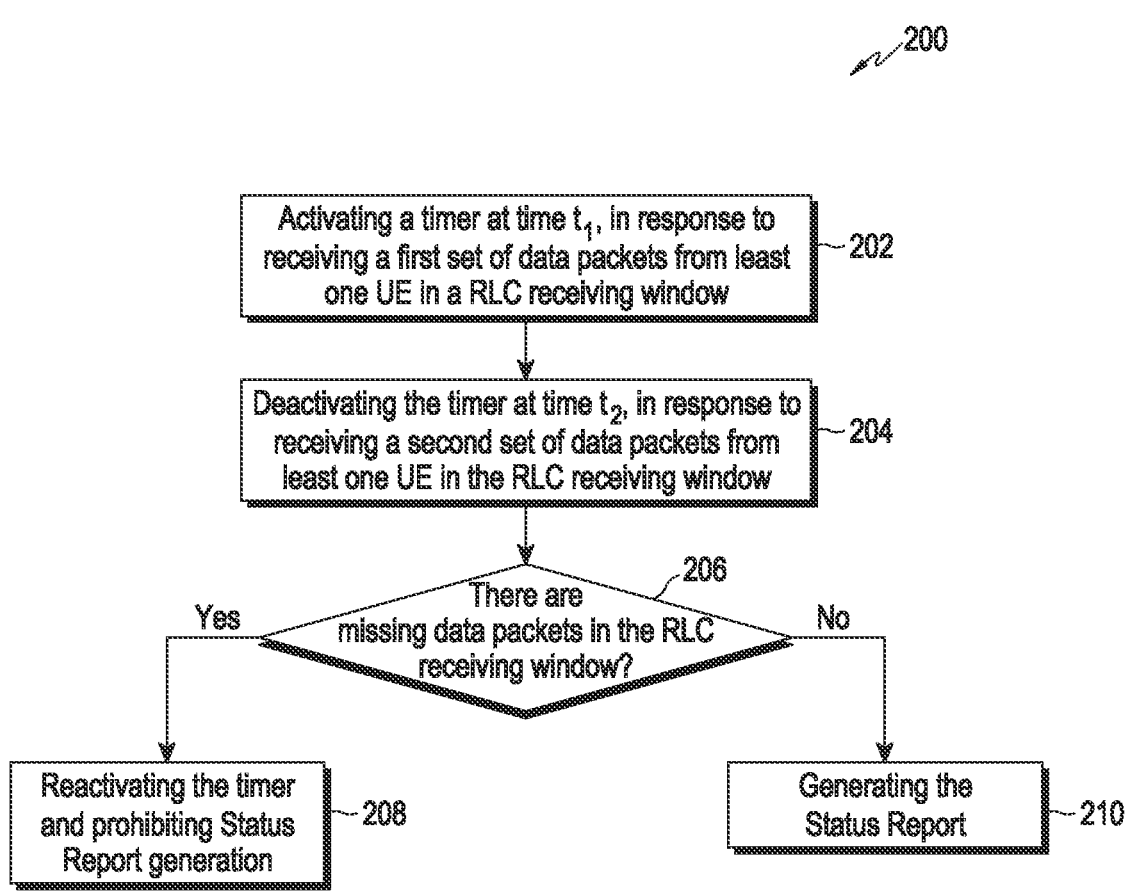
FIG. 2 is a flow chart illustrating a method for timer management in an RLC layer in a wireless communication system, according to an embodiment of the disclosure.

FIG. 2 is a flow chart (200) illustrating a method for timer management in an RLC layer in a wireless communication system, according to an embodiment of the disclosure.

Referring to FIG. 2, at operation 202, the method includes an RLC entity (100) activating a timer at time $t_1$, in response to receiving a first set of data packets from at least one UE in an RLC receiving window. In the RLC entity (100) described in FIG. 1, a time management controller (180) is configured to activate the timer at time $t_1$, in response to receiving the first set of data packets from at least one UE in the RLC receiving window.

At operation 204, the method includes the RLC entity (100) deactivating the timer at time $t_2$, in response to receiving the second set of data packets from the at least one UE in the RLC receiving window. For example, in the RLC entity (100) described in FIG. 1, the time management controller (180) is configured to deactivate the timer at time $t_2$, in response to receiving the second set of data packets from the least one UE in the RLC receiving window.

At operation 206, the method includes the RLC entity (100) determining whether there are missing data packets in the RLC receiving window. In the RLC entity (100) described in FIG. 1, the time management controller (180) is configured to determine whether there are missing data packets in the RLC receiving window.

At operation 208, the method includes the RLC entity (100) reactivating the timer and prohibiting status report generation, on determining that there are no missing data packets in the RLC receiving window. For example, in the RLC entity (100) described in FIG. 1, the time management controller (180) is configured to reactivate the timer and prohibiting status report generation, on determining that there are no missing data packets in the RLC receiving window.

At operation 210, the method includes the RLC entity (100) generating the status report, on determining that there are no missing data packets in the RLC receiving window. In the RLC entity (100) described in FIG. 1, the time management controller (180) is configured to generate the status report, on determining that there are no missing data packets in the RLC receiving window.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 3:
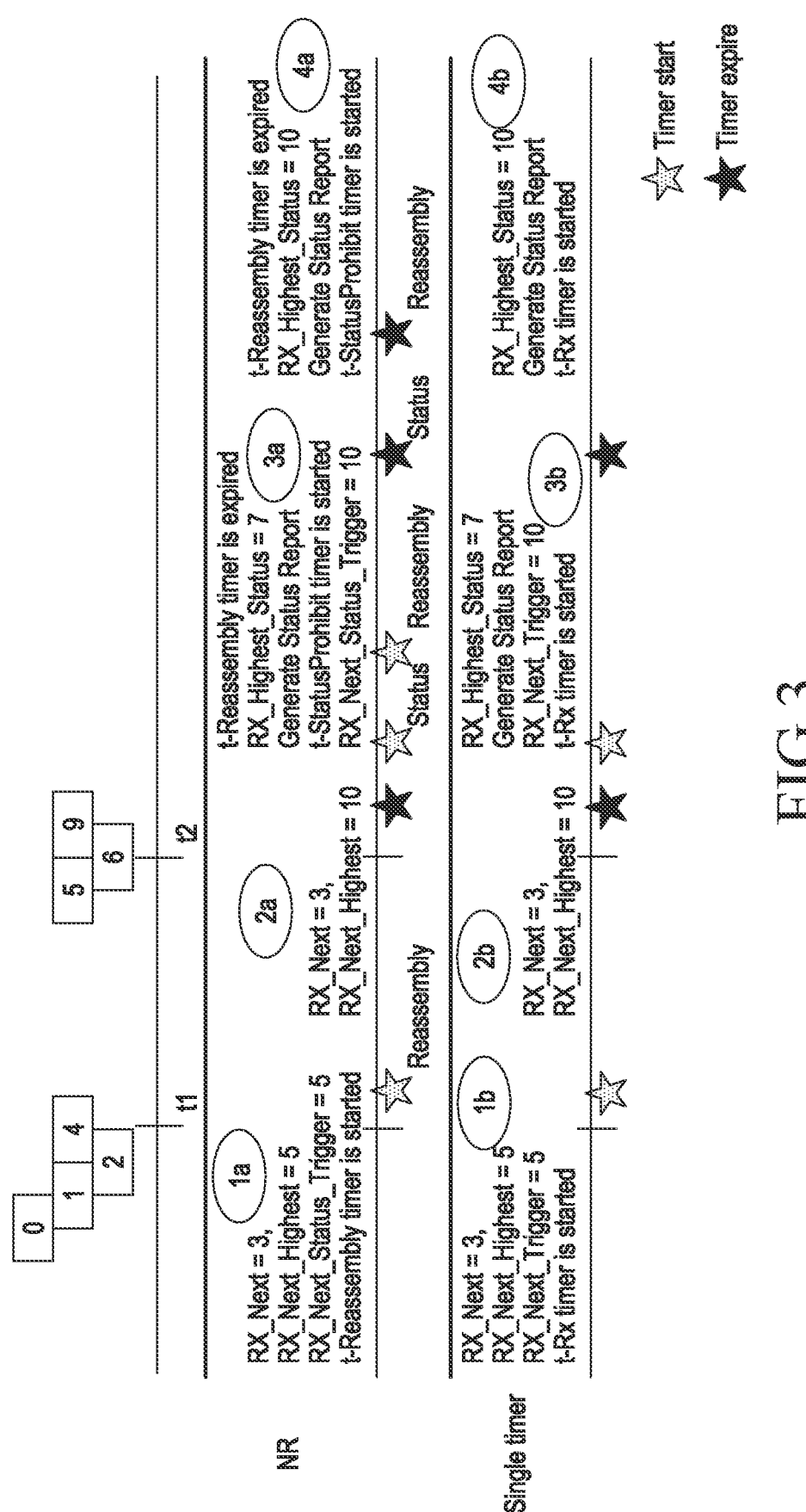
FIG. 3 is a timing diagram illustrating an example of a state variable update in existing 5G new radio (NR) and when a single t-Rx timer is used for RLC receiver (RX) processing, according to an embodiment of the disclosure.

FIG. 3 is a timing diagram illustrating an example of a state variable update in existing 5G NR and when a single t-Rx timer is used for RLC RX processing, according to an embodiment of the disclosure.

In general, multiple timers are required in the RLC layer for performing RLC functionalities which include three RLC timers are required per RLC entity (100). Further, the multiple RLC entities are supported at both the UE and a larger number of the RLC entities are supported at the wireless communication network with multiple UEs. As a result, a huge memory requirement and processing requirement in terms of handling timers arises, especially at the network entity.

In an embodiment, the two timers used in the RLC RX i.e. the t-Reassembly and the t-StatusProhibit timers have close functional dependencies and hence the proposed method includes replacing the two timers with a single timer. The RLC layer does not have very hard real time requirements and hence the same helps in cushioning to simplify certain processing using the single timer called t-Rx timer. In an embodiment, the single timer may be configured as a single-shot timer or as a periodic timer. Also, multiple timers may be merged under a single global timer when the timers are configured under periodic timer.

Consider that the RLC entity (100) is a receiver entity and that the receiver entity receives a Poll. If Status Report triggering conditions are met (including the POLL_SN condition) at the RLC entity (100) and if the t-Rx timer is not running, then the RLC entity (100) generates a status report and sends the status report to the lower layer for transmission. Once the status report is sent, the t-Rx timer is started. The further functions of the t-Rx timer is as follows:

---

If the t-Rx timer was running,

Trigger Status Report but delay the transmission of the Status Report until t-Rx timer expires.

If the t-Rx timer was not running,

If a new hole exists between RX_Next to RX_Next_Highest.

Set RX_Next_Trigger = RX_Next_Highest

Start a "t-Rx" timer.

On timer expiry of t-Rx,

If RX_Next_Trigger falls within the current Reordering window, (i.e. RX_Next_Trigger >= RX_Next)

Update RX_Highest_Status to SN >= RX_Next_Trigger which is not completely received.

Trigger a Status Report from RX_Next to RX_Highest_Status.

Else,

Adjust RX_Next_Trigger to RX_Next.

[RX_Highest_Status also continues to be in the Window]

If a new hole exists beyond RX_Highest_Status and RX_Next_Highest.

Set RX_Next_Trigger = RX_Next_Highest.

Start a "t-Rx" timer.

If Status Report trigger was set,

Generate the Status Report as per current state variables.

Start t-Rx if not running.

---

Referring to FIG. 3, at operation 1*a*, at time $t_1$ SN=0, 1, 2 and 4 are received at the RLC entity (100). In the NR scenario, the RX_Next=3, RX_Next_Highest=5, RX_Next_Status_Trigger=5 and the t-Reassembly timer is started. At operation 2*a*, the RX_Next=3, RX_Next_Highest=10. At time $t_2$ new SNs 5, 6 and 9 are received at the RLC entity (100) before the expiry of the t-Reassembly timer in the NR. However, a hole is already present due to missing PDUs (i.e., SN 3 is missing from first set of the data and SNs 7 and 8 are missing in the second set of data). At operation 3*a*, the t-Reassembly timer is expired, RX_Next_Highest=7 and the RLC entity (100) generates the status report and starts the t-statusProhibit timer and the RX_Next_Status_Trigger=10. Also, the t-Reassembly timer is again started. Further, the t-statusProhibit timer expires after sending the status report. At operation 4*a*, the t-Reassembly timer expires, the RX_Next_Highest=10. The RLC entity (100) generates the status report and starts the t-statusProhibit timer again.

Consider the proposed single timer at operation 1*b*, at time $t_1$ the SN=0, 1, 2 and 4 are received at the RLC entity (100) and the RX_Next=3, RX_Next_Highest=5, RX_Next_Status_Trigger=5 and the t-Rx timer is started. At operation 2*b*, the RX_Next=3, RX_Next_Highest=10. At time $t_2$ new SNs 5, 6 and 9 are received at the RLC entity (100) before the expiry of the t-Rx timer. The hole is present due to the missing PDUs. At operation 3*b*, the t-Rx timer is expired, RX_Next_Highest=7 and the RLC entity (100) generates the status report, the RX_Next_Status_Trigger=10 and starts the t-Rx timer again. At operation 4*b*, the t-Rx timer expires, the RX_Next_Highest=10. The RLC entity (100) generates the status report and starts the t-Rx timer again.

In the proposed method, the number of times the t-Rx timer is started for performing the basic operation is less as compared to the NR scenario. Also, from the comparison with the NR scenario, merging the functionalities of the t-Reassembly timer and the t-statusProhibit timer into the single t-Rx timer does not have a significant impact on the resulting outcome of the expected functionality of the RLC protocol.

The events related to State Variable update or for an action to be taken are updated at the periodic timer expiry event.

As shown in the example, a change of Status Variables like RX_Next_Trigger, Generation of status report happens on timer expiry event, as indicated in operations 1*c*, 2*c*, 3*c*, 4*c*, and 5*c*. Further, the soft Real time nature of the RLC allows operation at the RLC entity (100) to have a delay of max (2*timer value) which does not have an immediate impact on any of the important KPIs. However, the use of periodic timer saves on any timer start/stop operation.

Figure 4:
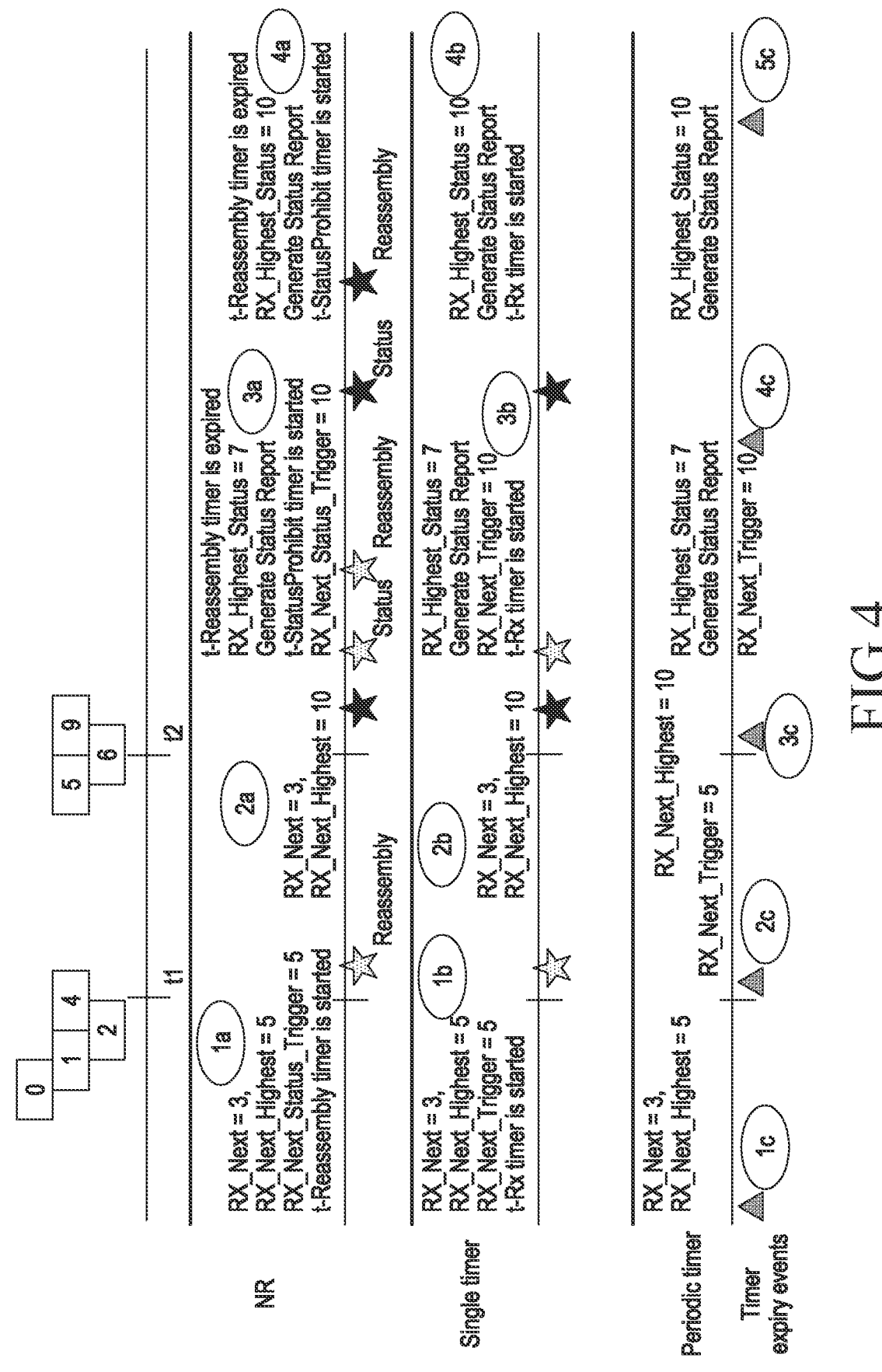
FIG. 4 is a timing diagram illustrating an example of a state variable update in existing 5G NR and when a single t-Rx timer is configured as periodic timers, according to an embodiment of the disclosure.

In FIG. 4, as compared to the single shot timer or the NR timer, the periodic timer operations "may" occur at an offset of the delta time delay=(timer_value) (Worst case=2*timer_value). From operation 2*c*, the Rx_Next_Trigger is updated not immediately on receiving the packets (SN=0, 1, 2, 4) but on timer expiry immediately after the arrival of packet at time $t_1$.

In another embodiment, the single shot t-Rx timer may further optionally have a flag which may be set to true based on the condition on which the t-Rx timer was started in the first place. The flags may be identified as a Reassembly_flag and a StatusReport_flag.

The Reassembly_flag and the StatusReport_flag are set conditionally for different scenarios as follows:

```
If poll is received,
    If t-Rx timer is not running,
        Set the StatusReport_flag = TRUE.
        Generate and transmit the Status Report.
        Start t-Rx timer
    If t-Rx timer was running,
        If StatusReport_flag == FALSE,
        Set the StatusReport_flag = TRUE.
        Generate and transmit the Status Report.
```

In an embodiment, the timer expiry procedure is same as compared to the single shot t-Rx timers. The changes are to be made to ensure that there is no break in functionality.

```
If a new RLC SN is received,
    If t-Rx timer is running and if Reassembly_flag == FALSE (implies
    StatusReport_flag == TRUE)
        If RX_Next_Trigger is falling outside the reordering window,
            Stop the t-Rx timer.
    If t-Rx timer is not running, including the above case when the timer is stopped,
        If a new hole further exists between RX_Next and RX_Next_Highest,
            Set RX_Next_Trigger = RX_Next_Highest.
            Set Reassembly_flag = TRUE.
            StatusReport_flag continues to be TRUE.
            Start the t-Rx timer.
        Else
            Reset StatusReport_flag = FALSE.
```

FIG. 4 is a timing diagram illustrating an example of a state variable update in existing 5G NR and when a single t-Rx timer is configured as periodic timers, according to an embodiment of the disclosure.

Referring to FIG. 4, in conjunction with FIG. 3, considering the scenarios described in FIG. 3 with respect to a NR and a single t-Rx timer, another optional embodiment includes configuring the t-Rx timer as a periodic timer. The periodic timer may continue to run irrespective of the multiple resource blocks (RBs) or the UEs configured, running as a global timer. In the configuration of the periodic timer, no procedure is provided to start the periodic timer.

FIGS. 5A, 5B, 5C, 5D, and 5E are timing diagrams illustrating various scenarios of comparison of a state variable update in existing 5G NR, a single t-Rx timer and periodic timers, according to various embodiments of the disclosure.

Figure 5A:
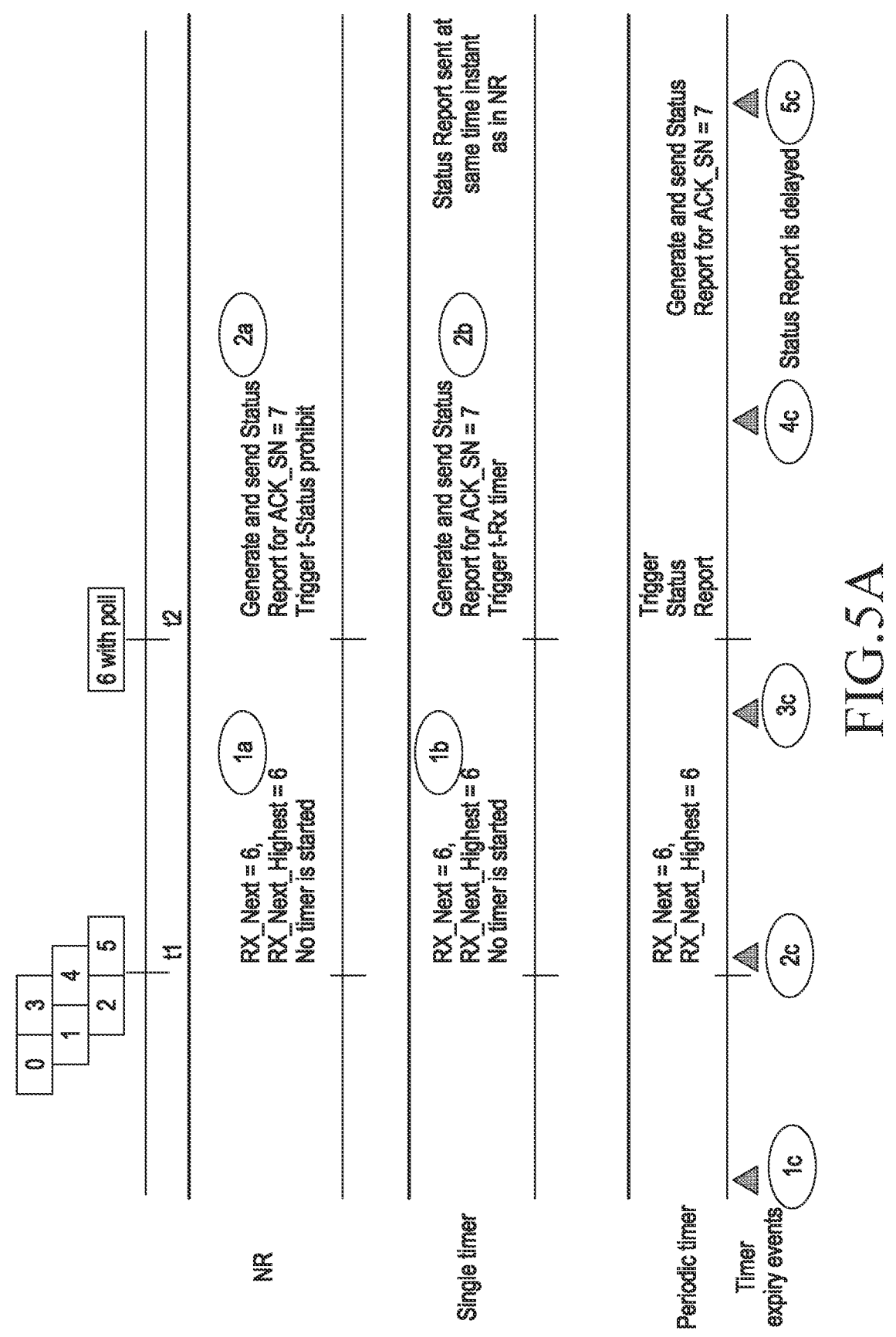
FIGS. 5A, 5B, 5C, 5D, and 5E are timing diagrams illustrating various scenarios of comparison of a state variable update in existing 5G NR, a single t-Rx timer and periodic timers, according to various embodiments of the disclosure.

Referring to FIG. 5A, consider a case where no data packets are missing. SN=0, 1, 2, 3, 4 and 5 received at the time $t_1$ and no status report is triggered in the NR case as well as in the single shot timer case. At time $t_2$ SN=6 is received with poll. Therefore, at both operations 2*a* and 2*b*, the status report is generated and sent for ACK_SN=7. Once the status report is sent, the t-StatusProhibit timer is started in the NR case and the t-Rx timer is started in the single timer case, respectively. The status report is sent at same time instant as in both the NR and the single timer scenarios. However, in case of the periodic timers, the status report is delayed as the status report is generated on the timer expiry event only (4c).

Figure 5B:
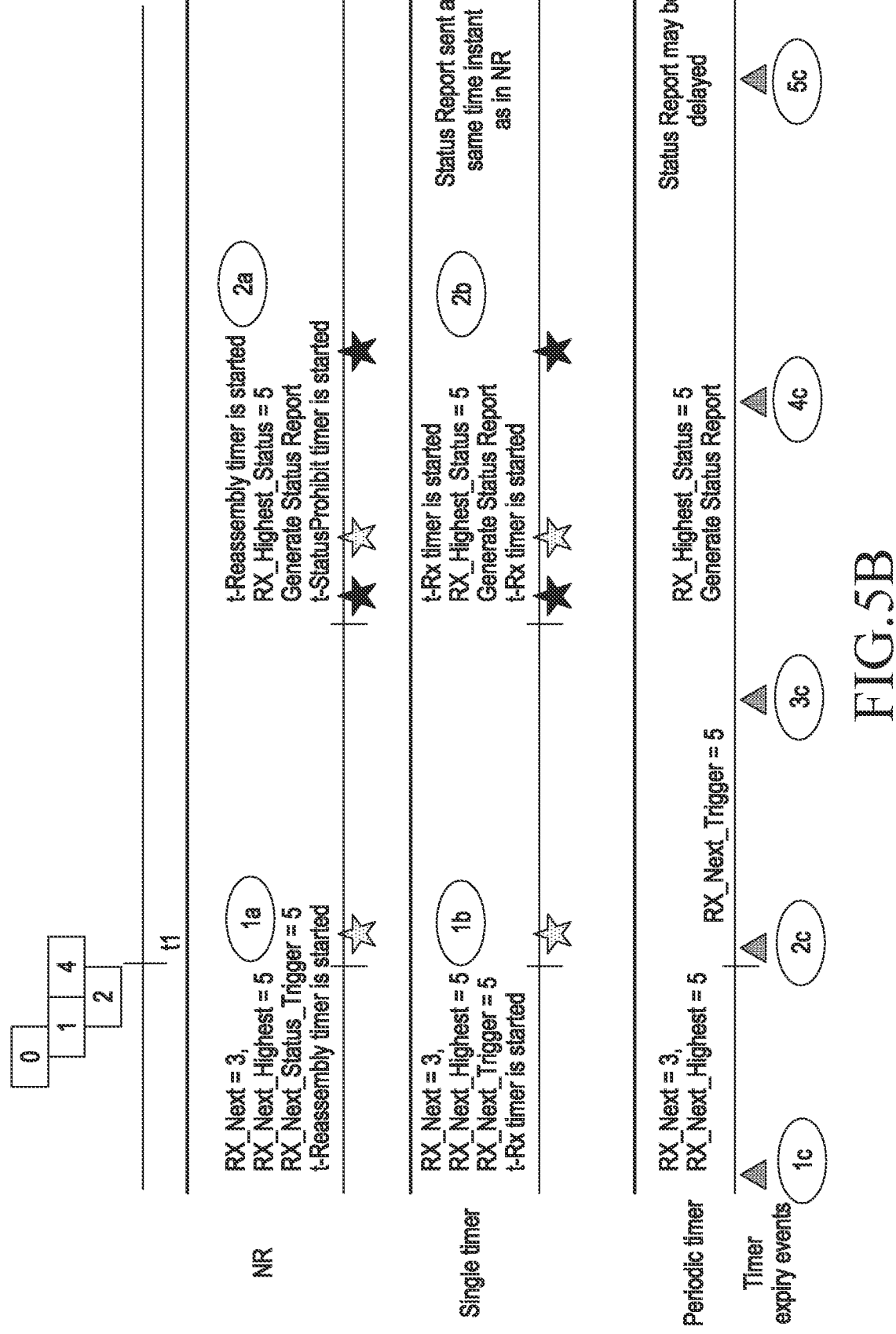

Referring to FIG. 5B, consider a case where a packet is missing. SN=0, 1, 2 and 4 received at the time $t_1$ (as indicated by operations 1a and 1b). SN=3 is not received even after the expiry of timers t-Reassembly timer in the NR case (operation 2a) and the t-Rx timer in the single timer case (operation 2b). Once the status report is sent, the t-StatusProhibit timer is started in the NR case and the t-Rx timer is started in the single timer case, respectively. The status report is sent at same time instant as in both the NR and the single timer scenarios. However, in case of the periodic timer, the status report is delayed as the status report is generated on the timer expiry event only (4c).

Figure 5C:
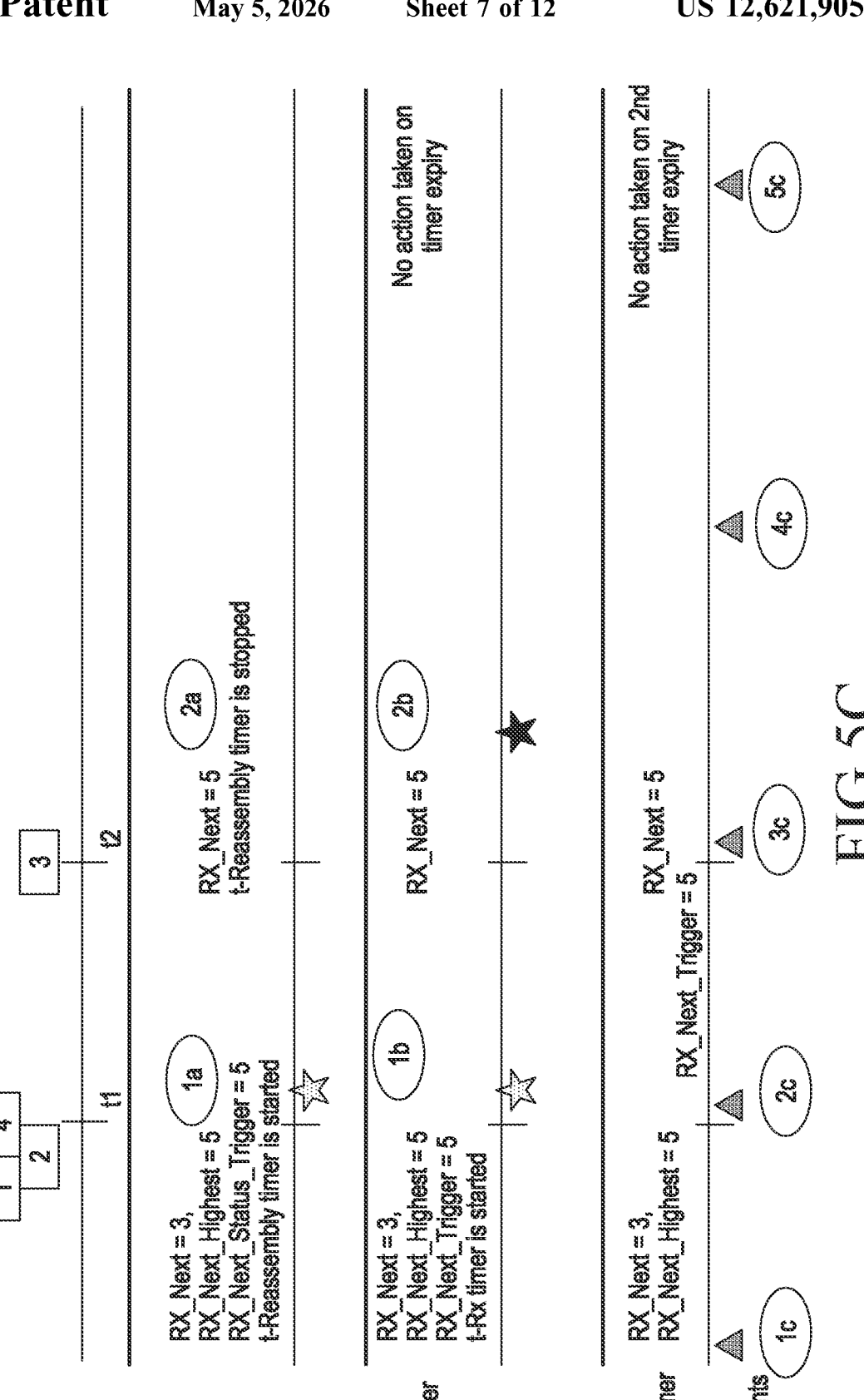

Referring to FIG. 5C, consider a case where a packet is missing, but received before timer expiry event. SN=0, 1, 2 and 4 received at the time $t_1$. SN=3 is received at the time $t_2$ before the timer expires i.e., the t-Reassembly timer in the NR case (operation 2a), the t-Rx timer in the single timer case (operation 2b) and the periodic timer case (operation 3c). In each of the cases no action is taken on the expiry of the respective timers as the missing data is received before the expiry of the respective timers.

Figure 5D:
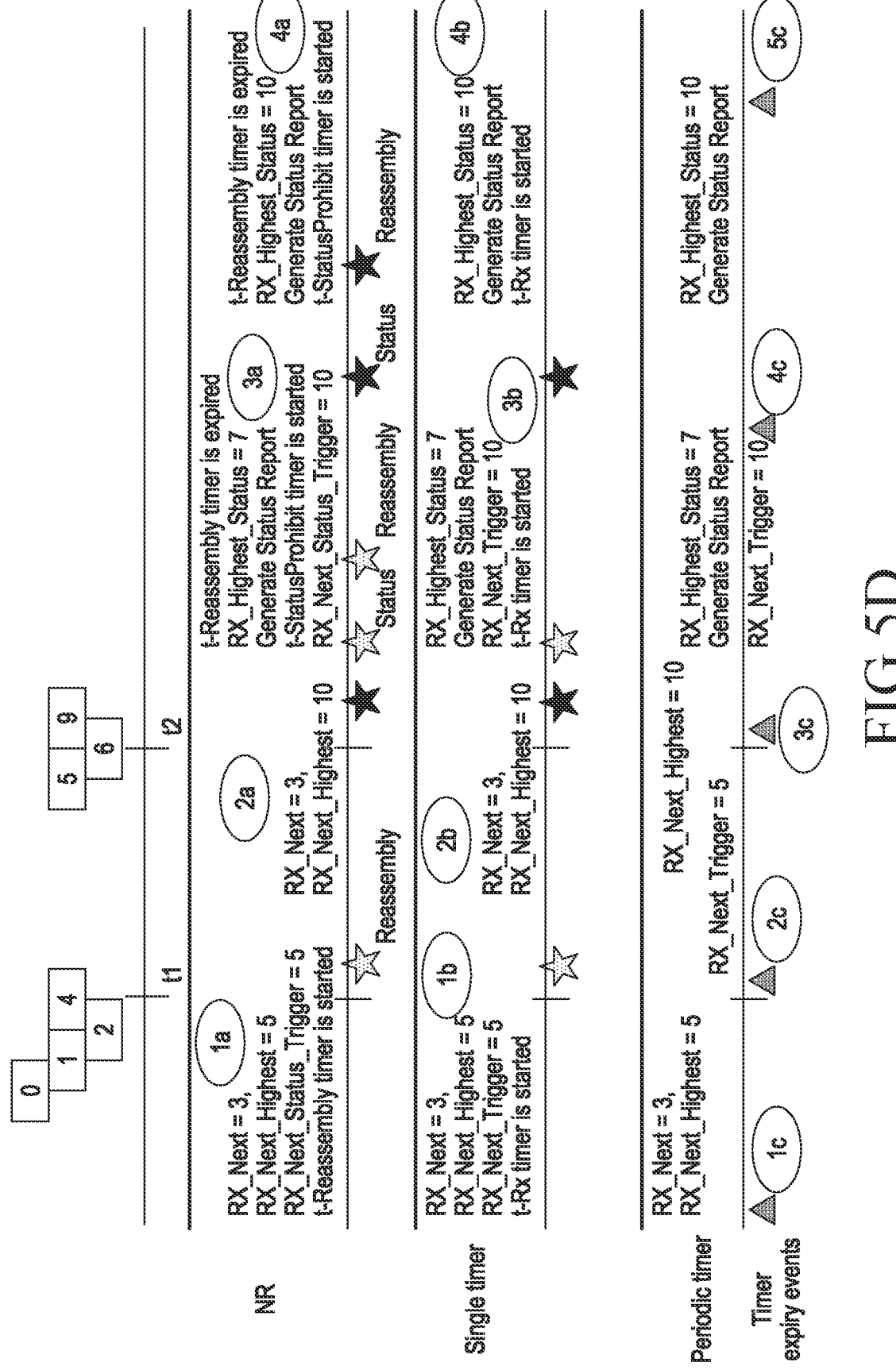

Referring to FIG. 5D, consider a case where a new hole exists even after the expiry of the timer. SN=0, 1, 2 and 4 received at the time $t_1$. SN=5, 6 and 9 are received at the time $t_2$ before the expiry of the timer. But SN=3, 7, 8 are missing data packets. In an embodiment, as explained with respect to FIG. 4, the number of times the t-Reassembly timer and the t-StatusProhibit timer are executed in total in the NR case is greater when compared to the number of times the t-Rx timer is executed in the single timer case. As a result, the proposed single timer reduces the memory requirement and the processing requirement by combining the functions of the t-Reassembly timer and the t-StatusProhibit timer into the single timer i.e., the t-Rx timer. However, in the periodic timer case, the Rx_Next_Trigger=5 is updated not immediately on receiving the packets (S).

Figure 5E:
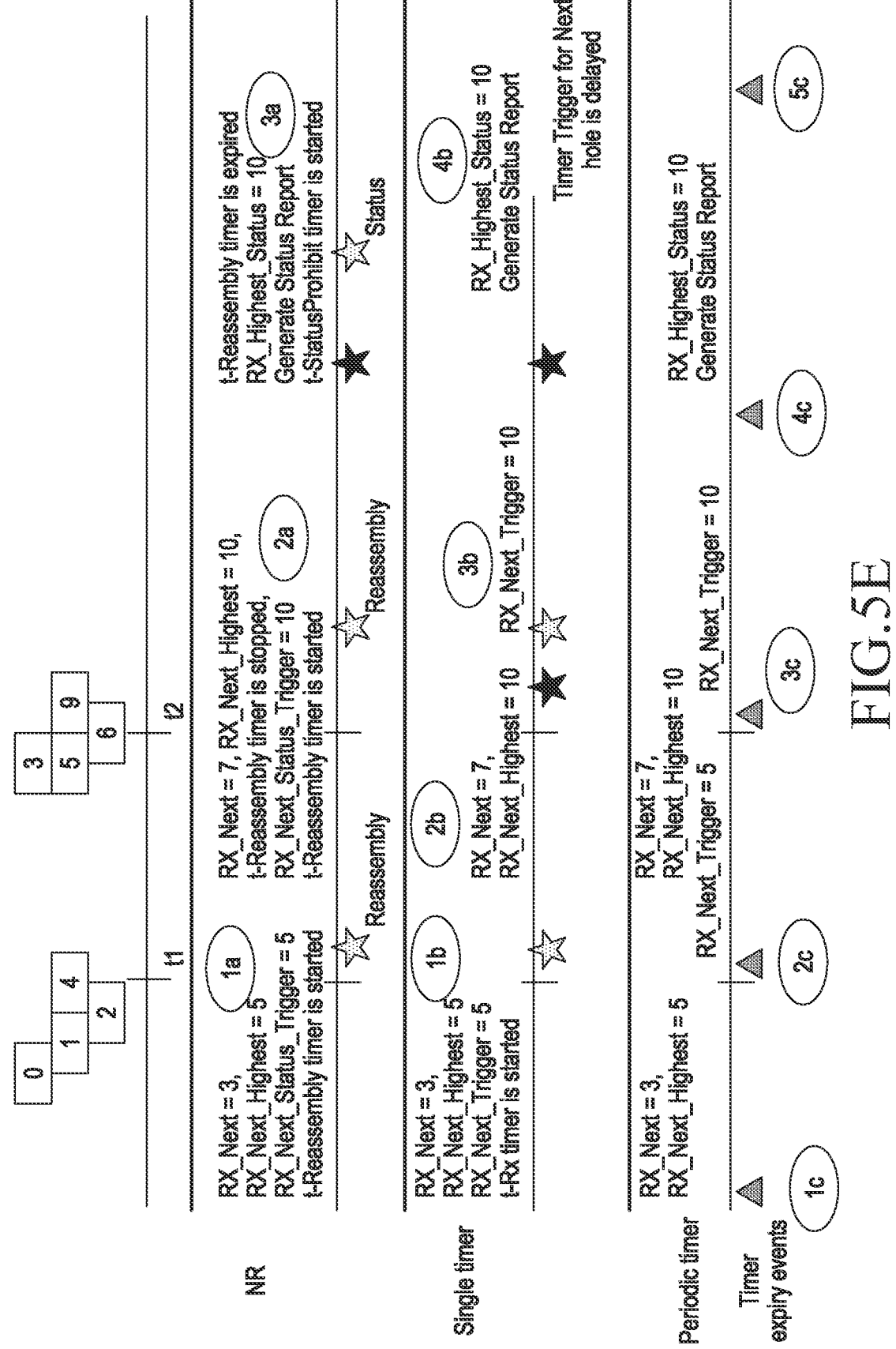

Referring to FIG. 5E, consider a case where there are multiple RLC entities (say for example RLC receiver entities) and there are data packets missing which are recovered before the timer expiry but a new hole is present. SN=0, 1, 2 and 4 received at the time $t_1$. SN=3, 5, 6 and 9 received at time $t_2$ before the timer expires. The missing data packets are SN=7 and 8. However, the timer trigger for the next hole is delayed. Therefore, FIGS. 5A to 5E indicates that there is no much impact in terms of procedures at the RLC layer by removing the one timer functionality. In an embodiment, worst case certain timer expiry procedures are delayed by a timer value. However, the memory requirement and the processing requirement of the system is saved, which helps in effective utilization of the resources of the system.

FIG. 6A is an example illustrating a comparison between t-Rx=t-Reassembly>t-StatusProhibit timer, according to an embodiment of the disclosure.

Referring to FIG. 6A, at operation 1 in the NR scenario, at time $t_1$ SN=0, 1, 2 and 4 are received at the RLC entity (100). The RX_Next=3, RX_Next_Highest=5, RX_Next_Status_Trigger=5, RX_Next_Highest Status=3 and the t-Reassembly timer is started.

In an embodiment, at time $t_2$ new SNs 5 and 6 with poll are received at the RLC entity (100) before the expiry of the t-Reassembly timer. RX_Next_Highest=7. Since poll is received status will be delayed till RX_Next_Highest_Status<pollSN(6). At time $t_2$, the t-Reassembly timer is still running, RX_Next_Highest=10. Since poll is received status will be delayed till RX_Next_Highest Status<pollSN(6). If the t-Reassembly timer expires before time $t_3$, status report of same ACK_SN=6 will be sent. T-StatusProhibit is started. At time $t_3$, the t-Reassembly timer starts and the status is delayed. Further, the RX_Next=3, RX_Next_Highest=9, RX_Next_Status_Trigger=9, RX_Next_Highest_Status=7. The next status may be sent only when both the t-Reassembly timer and the t-StatusProhibit timer expires.

Consider the single timer case at operation 2 in conjunction with the operation 1. Instead of the t-Reassembly timer at operation 2, the t-Rx timer is started at the time $t_1$. At time $t_2$ new SNs 5 and 6 with poll are received at the RLC entity (100) when the t-Rx timer is still running RX_Next_Highest=7. Since poll is received status will be delayed. Similarly, at the time $t_3$ the SN=9 is received with poll at the RLC entity (100) when the t-Rx timer is still running RX_Next_Highest=10. Since poll is received status will be delayed. Further, when the t-Rx timer expires, RX_Next_Highest=5. The status report is generated with ACK_SN=5 and NACK_SN=3. Additionally, the RX_Next_Trigger=10 and the t-Rx timer is started again. Here the time taken to generate and send the status report is same as the time taken in case of the NR scenario.

In an embodiment, when the t-Rx timer expires, RX_Next_Highest is updated to 10, the status report is generated with ACK_SN=5 and NACK_SN=3. The RX_Next_Trigger is kept at 10 and the t-Rx timer is started again. The number of status reports that are generated in the single timer scenario and the NR scenario are both the same. Therefore, there is hardly any change with the outcome of the comparison based on the timer values.

FIG. 6B is an example illustrating a comparison between t-Rx=t-Reassembly timer<t-StatusProhibit timer, according to an embodiment of the disclosure.

Referring to FIG. 6B, in conjunction with FIG. 6A, the operation 1 in FIG. 6B is substantially the same as the operation 1 in FIG. 6A and hence repeated description is omitted. However, consider the t-StatusProhibit timer>t-Reassembly timer or t-Reassembly timer does not have much impact on the status reporting.

In the operation 2, at the time $t_3$ the SN=9 is received with poll at the RLC entity (100) when the t-Rx timer is still running RX_Next_Highest=10. Since poll is received status will be delayed. Further, when the t-Rx timer expires, RX_Next_Highest=5. The status report is generated with ACK_SN=5 and NACK_SN=3. Further, the RX_Next_Trigger=10 and the t-Rx timer is started again. Here the status report is generated at the same time as that of the t-Reassembly timer in the NR scenario.

Impact on $3^{rd}$ generation partnership project (3GPP) Specification 38.322: In the 3GPP Specification 38.322 the t-Reassembly timer is to be replaced with the proposed t-Rx timer.

At section 5.2.3.2.3 actions when an AMD PDU is placed in the reception buffer, the changes are to be made as follows: all conditions for window state variable update remain same, remove the condition under, if the t-Rx is running, not supported with the proposed method and remove the condition for stopping any timer as it is not supported.

If t-Rx is not running:
- if RX_Next_Highest> RX_Next +1; or
- if RX_Next_Highest = RX_Next + 1 and there is at least one missing byte segment of
the SDU associated with SN = RX_Next before the last byte of all received segments of this
SDU:
- start t-Rx timer;
- set RX_Next_Trigger to RX_Next_Highest.
    At section 5.2.3.2.4Actions when t-Rx expires:When t-Rx expires, the
    receiving side of an AM RLC entity shall:
If RX_Next <= RX_Next_Trigger< RX_Next + AM_Window_Size
- update RX_Highest_Status to the SN of the fust RLC SDU with SN >=
RX_Next_Trigger for which not all bytes have been received;
- Trigger a Status PDU
Else
- Set RX_Next_Trigger to RX_Next.
If RX_Next_Highest> RX_Highest_Status +1: or
If RX_Next_Highest = RX_Highest_Status + 1 and there is at least one missing byte segment
of the SDU associated with SN = RX_Highest_Status before the last byte of all received
segments of this SDU:
- Start t-Rx timer;
- set RX_Next_Trigger to RX_Next_Highest.
If Status PDU was triggered;
If Status PDU was delayed previously, and if POLL_SN < RX_Highest_Status or POLL_SN
>= RX_Next + AM_Window_Size,
- at the first transmission opportunity indicated by lower layer, construct a STATUS
PDU and submit it to lower layer.
If t-Rx timer is not running,
- Start t-Rx timer.

At section 5.3.4: Status reporting: the changes are all conditions for status reporting remain same update remain same, the t-StatusProhibit timer to be replaced with t-Rx timer.

Figure 7:
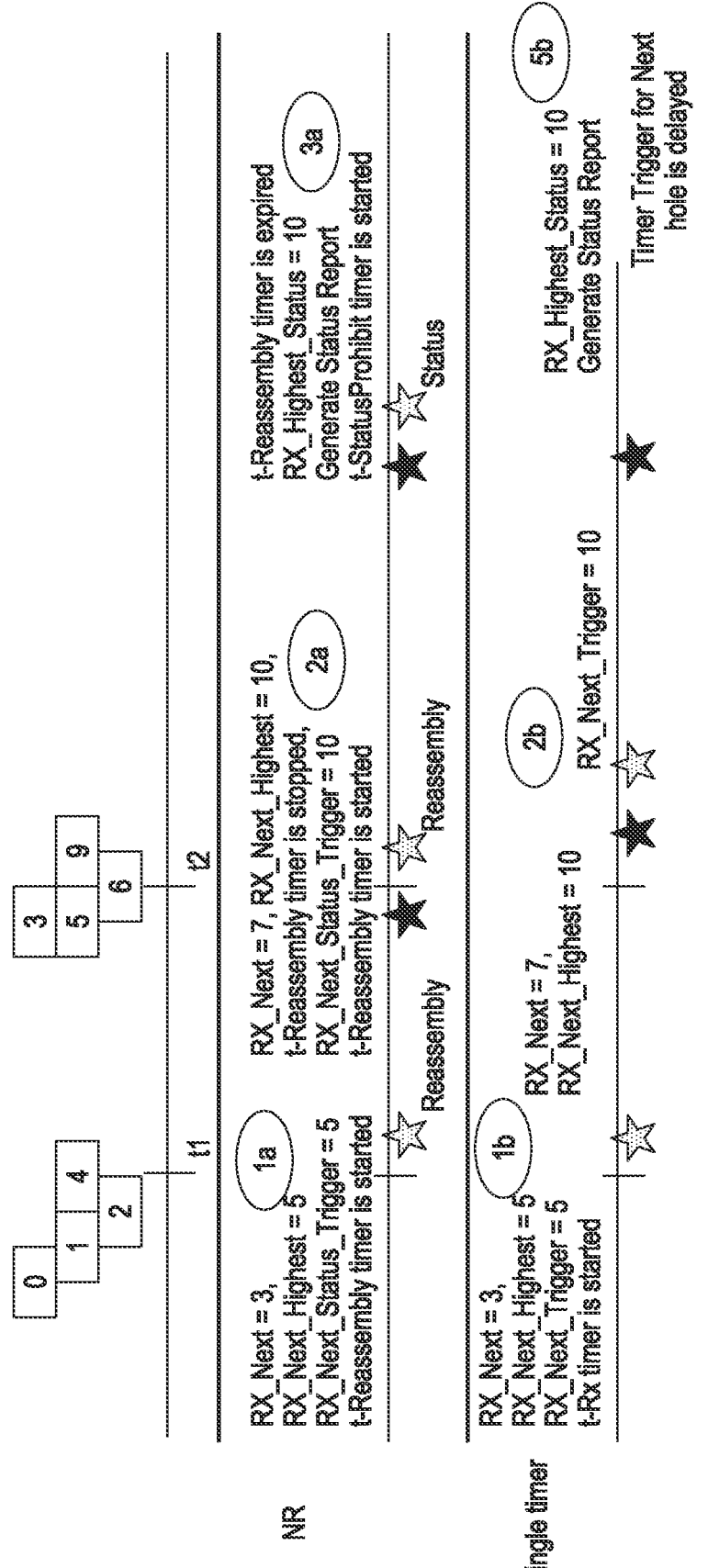
FIG. 7 is a timing diagram illustrating a comparison between a NR scenario and a single t-Rx timer when a timer is triggered for next hole is delayed, according to an embodiment of the disclosure.

FIG. 7 is a timing diagram illustrating a comparison between a NR scenario and a single t-Rx timer when a timer is triggered for next hole is delayed, according to an embodiment of the disclosure.

Referring to FIG. 7, consider an example of how the procedure of handling the t-RX timer instead of t-Status-Prohibit and t-Reassembly timer can still yield the same functionality for the RLC entity (100). The RLC Packet Number 0, 1, 2, and 4 are received at the time $t_1$ and the packet number 3, 5, 6 and 9 received at the time $t_2$. However, the packets with number 7 and 8 are missing. The minute difference in the functionality is highlighted. At operation 1$a$, at time $t_1$ SN=0, 1, 2 and 4 are received at the RLC entity (100). In the NR scenario, the RX_Next=3, RX_Next_High-est=5, RX_Next_Status_Trigger=5 and the t-Reassembly timer is started. At operation 2$a$, the RX_Next=7, RX_Next_Highest=10. At time $t_2$ new SNs 3, 5, 6 and 9 are received at the RLC entity (100) and therefore the t-Reas-sembly timer is stopped. However, no status report is sent as the first set of data is completely received (SN=3 received at time $t_2$) before the expiry of the t-Reassembly timer. The RX_Next_Status_Trigger=10 and the t-Reassembly timer is started again. At operation 3$a$, the t-Reassembly timer expires however; the hole is already present due to missing PDUs (i.e., SNs 7 and 8 are missing in the second set of data). The RLC entity (100) generates the status report and starts the t-statusProhibit timer and the RX_Next_Statu-s_Trigger=10.

In case of the single timer, at operation 1$b$ the t-Rx timer is started instead of the t-Reassembly timer started in the operation 1$a$. However, the t-Rx timer expires after the second set of data is received at time $t_2$. The RX_Next_Trig-ger=10 and again the t-Rx timer is started. The RLC entity (100) determines that there are missing data and generates the status report after which the t-Rx timer is stopped. In the proposed method the timer triggered for next hole is delayed when compared to the t-Reassembly timer which is triggered for the second time at operation 2$a$. Therefore, at operation 5$b$, the delay in the triggering of the t-Rx timer for the next hole also helps in efficient utilization of the memory and processing requirements at the RLC entity (100).

While the disclosure has been shown and described with reference to various embodiments thereof, it will be under-stood by those skilled in the art that various changes in form and details may be made therein without departing from the spirit and scope of the disclosure as defined by the appended claims and their equivalents.

What is claimed is:

1. A method for timer management in a radio link control (RLC) layer in a wireless communication system, the method comprises:

activating, by an RLC entity, a timer at first time, in response to receiving a first set of data packets from at least one user equipment (UE) in an RLC receiving window;

deactivating, by the RLC entity, the timer at second time, in response to receiving a second set of data packets from the at least one UE in the RLC receiving window before the timer expires;

determining, by the RLC entity, whether there is at least one missing data packet in the RLC receiving window after the timer expires;

when it is determined that there is the at least one missing data packet in the RLC receiving window after the timer expires, reactivating, by the RLC entity, the timer and prohibiting a generation of a status report until the reactivated timer expires; and when it is determined that there are no missing data packets in the RLC receiving window after the timer expires, generating, by the RLC entity, the status report and starting the timer, wherein the timer includes a first flag for reassembly of the at least one missing data packet and a second flag for the status report, wherein, when it is determined that there is the at least one missing data packet in the RLC receiving window after the timer expires, the first flag and the second flag are set to a true, and wherein, when it is determined that there are no missing data packets in the RLC receiving window after the timer expires, the second flag is set to a false.

2. The method of claim 1, wherein the timer functions simultaneously as a first timer and a second timer of the RLC layer, and wherein the first timer is used to detect that there is the at least one missing data packet in the RLC receiving window, and the second timer is used to prohibit a transmission of the status report associated with the at least one missing data packet.

3. The method of claim 1, wherein the timer is implemented as a single timer for the RLC layer of the at least one UE and the RLC entity when a value of the timer and a value of a poll timer are same.

4. The method of claim 3, wherein the single timer is implemented as one of a single shot timer specific to the RLC entity and a periodic timer for multiple RLC entities associated with the RLC layer.

5. The method of claim 4, wherein the timer is implemented as the periodic timer when timer values configured for each of the multiple RLC entities are same.

6. A radio link control (RLC) entity for timer management in an RLC layer in a wireless communication system, the RLC entity comprises:

a transceiver;

memory, comprising one or more storage media, storing instructions; and at least one processor coupled to the transceiver and the memory, wherein the instructions, when executed by the at least one processor individually or collectively, cause the RLC entity to:

activate a timer at first time, in response to receiving a first set of data packets from at least one UE in an RLC receiving window, deactivate the timer at second time, in response to receiving a second set of data packets from the at least one UE in the RLC receiving window before the timer expires, determine whether there is at least one missing data packet in the RLC receiving window after the timer expires, when it is determined that there is the at least one missing data packet in the RLC receiving window after the timer expires, reactivate the timer and prohibit a generation of a status report until the reactivated timer expires, and when it is determined that there are no missing data packets in the RLC receiving window after the timer expires, generate the status report and starting the timer, wherein the timer includes a first flag for reassembly of the at least one missing data packet and a second flag for the status report, wherein, when it is determined that there is the at least one missing data packet in the RLC receiving window after the timer expires, the first flag and the second flag are set to a true, and wherein, when it is determined that there are no missing data packets in the RLC receiving window after the timer expires, the second flag is set to a false.

7. The RLC entity of claim 6, wherein the timer functions simultaneously as a first timer and a second timer of the RLC layer, wherein the first timer is used to detect that there is the at least one missing data packet in the RLC receiving window, and wherein the second timer is used to prohibit a transmission of the status report associated with the at least one missing data packet.

8. The RLC entity of claim 6, wherein the timer is implemented as a single timer for the RLC layer of the at least one UE and the RLC entity when a value of the timer and a value of a poll timer are same.

9. The RLC entity of claim 8, wherein the single timer is implemented as one of a single shot timer specific to the RLC entity and a periodic timer for multiple RLC entities associated with the RLC layer.

10. The RLC entity of claim 9, wherein the timer is implemented as the periodic timer when timer values configured for each of the multiple RLC entities are same.

* * * * *